United States Patent
Mallinson et al.

(10) Patent No.: US 11,354,237 B2
(45) Date of Patent: Jun. 7, 2022

(54) MULTIPORT MEMORY WITH ANALOG PORT

(71) Applicant: SiliconIntervention Inc., Kelowna (CA)

(72) Inventors: A. Martin Mallinson, Kelowna (CA); Christian Leth Petersen, Burnaby (CA)

(73) Assignee: SiliconIntervention Inc., Kelowna (CA)

( * ) Notice: Subject to any disclaimer, the term of this patent is extended or adjusted under 35 U.S.C. 154(b) by 281 days.

(21) Appl. No.: 16/821,191

(22) Filed: Mar. 17, 2020

(65) Prior Publication Data

US 2020/0301827 A1 Sep. 24, 2020

Related U.S. Application Data

(60) Provisional application No. 62/819,876, filed on Mar. 18, 2019.

(51) Int. Cl.
  *G06F 12/02* (2006.01)
  *G06N 3/10* (2006.01)
  *G06N 3/063* (2006.01)

(52) U.S. Cl.
  CPC ......... *G06F 12/0292* (2013.01); *G06N 3/063* (2013.01); *G06N 3/10* (2013.01)

(58) Field of Classification Search
  None
  See application file for complete search history.

(56) References Cited

U.S. PATENT DOCUMENTS

| | | | | |
|---|---|---|---|---|
| 5,063,521 A | * | 11/1991 | Peterson | G06N 3/063 365/49.1 |
| 9,460,048 B2 | | 10/2016 | Pechanek | |
| 2006/0181539 A1 | * | 8/2006 | Akimoto | G09G 3/3688 345/551 |
| 2008/0319933 A1 | * | 12/2008 | Moussa | G06N 3/084 706/31 |
| 2019/0057304 A1 | * | 2/2019 | Mathuriya | H03M 1/12 |

FOREIGN PATENT DOCUMENTS

WO WO2008067676 A1 6/2008

OTHER PUBLICATIONS

"7 Series FPGAs Memory Resources—User Guide," Xilinx, UG473 v1.13, Feb. 5, 2019, ("https://www.xilinx.com/support/documentation/user_guides/ug473_7Series_Memory_Resources.pdf").
"Processing in Memory: The Mythic Advantage," Mythic, 2019, ("https://www.mythic-ai.com/technology/").

\* cited by examiner

*Primary Examiner* — Yaima Rigol
(74) *Attorney, Agent, or Firm* — Gard & Kaslow LLP

(57) ABSTRACT

A multiport memory in which one of the ports is analog rather than digital is described. In one embodiment, the analog port functions as a read-only port and the digital port functions as a write only port. This allows the data in the core memory to be applied to an analog signal, while retaining a digital port having access to the core memory for rapid storage of data. One potential use of such a multiport memory is as a bridge between a digital computer and an analog computer; for example, this allows a digitally programmed two-port memory to derive a sum-of-products signal from a plurality of analog input signals, and a plurality of such multiport memories to be used in an analog neural network such as a programmable neural net implementing analog artificial intelligence (AI).

11 Claims, 5 Drawing Sheets

MULTIPORT MEMORY WITH ANALOG PORT

This application claims priority from Provisional Application No. 62/819,876, filed Mar. 18, 2019, which is incorporated by reference herein in its entirety.

FIELD OF THE INVENTION

The present invention relates generally to multiport memory, and more particularly to a two-port memory that may be used in an analog neural network.

BACKGROUND OF THE INVENTION

Multiport memories are well known in the art. A random-access memory (RAM) may be designed to have two or more sets of control lines, multiple sets of data lines, multiple sets of address lines and multiple sets of control signals. These signals can operate independently and allow two or more processes to access the same core memory elements; thus, the multiport RAM allows multiple reads or writes to occur at the same time, typically at different addresses in the RAM, in contrast to single port RAM, which can access only one memory location at a time.

One common form of a multiport memory is a two-port, or dual-port, memory. Memory access for reads and writes is commonly controlled by a clock, although some asynchronous two-port memories are available, which respond to address and control pin changes without the need for a clock or counter while allowing simultaneous access to a single RAM memory location from two buses. In such asynchronous devices, arbitration logic may be used to insure that simultaneous writes to the same memory location do not occur.

FIG. 1 shows an example of a two-port memory 100, from a Xilinx 7 Series Field Programmable Gate Array (FPGA). The two sets of control signals are labeled 'A' and 'B' and both control groups access the same internal 36 Kb memory, but share nothing else. As can be seen from the signals "CLKA" and "CLKB", the Xilinx device is clocked, and nothing happens without a clock signal.

Prior art multiport memories are digital. It would be advantageous to have a multiport memory with an analog port allowing the data in the core memory to be applied to an analog signal, while retaining a digital port for rapid storage of the data in the core memory.

SUMMARY OF THE INVENTION

Described herein is a multiport memory having an analog port that may be used in an analog neural network.

One embodiment describes a multiport memory, comprising: a memory core containing memory cells arranged in a matrix having a plurality of lines, each line having a separate address; a digital port configured to: receive a first plurality of bits representing an address of one of the plurality of lines of memory cells; and receive a second plurality of bits representing values that are to be stored in the one of the plurality of lines of memory cells at the address represented by the first plurality of bits; and an analog port configured to: receive a plurality of analog input quantities, each input quantity corresponding to one of the plurality of lines of memory cells; and generate a plurality of analog output quantities, the plurality of analog output quantities being a sum of products of each of the analog input quantities multiplied by the value stored on the one of the plurality of lines corresponding to each of the analog input quantities.

Another embodiment describes a neural network comprising first and second multiport memories, each multiport memory comprising: a memory core containing memory cells arranged in a matrix having a plurality of lines, each line having a separate address; a digital port configured to: receive a first plurality of bits representing an address of one of the plurality of lines of memory cells; and receive a second plurality of bits representing values that are to be stored in the one of the plurality of lines of memory cells at the address represented by the first plurality of bits; and an analog port configured to: receive a plurality of analog input quantities, each input quantity corresponding to one of the plurality of lines of memory cells; generate a plurality of analog output quantities, the plurality of analog output quantities being a sum of products of each of the analog input quantities multiplied by the value stored on the one of the plurality of lines corresponding to each of the analog input quantities; and wherein the plurality of analog output quantities generated by the first multiport memory are the analog input quantities received by the second multiport memory.

DETAILED DESCRIPTION OF THE INVENTION

Described herein is a multiport memory in which one of the ports is analog rather than digital. In one embodiment, the analog port functions as a read-only port and the digital port functions as a write-only port. This allows the data in the core memory to be applied to an analog signal, while retaining a digital port having access to the core memory for rapid storage of data. In another embodiment, the digital port may also function as a read and write port.

One potential use of such a multiport memory is as a bridge between a digital computer and an analog computer; for example, this allows a plurality of such multiport memories to be used in an analog neural network such as a programmable neural net implementing analog artificial intelligence (AI).

Figure 1:
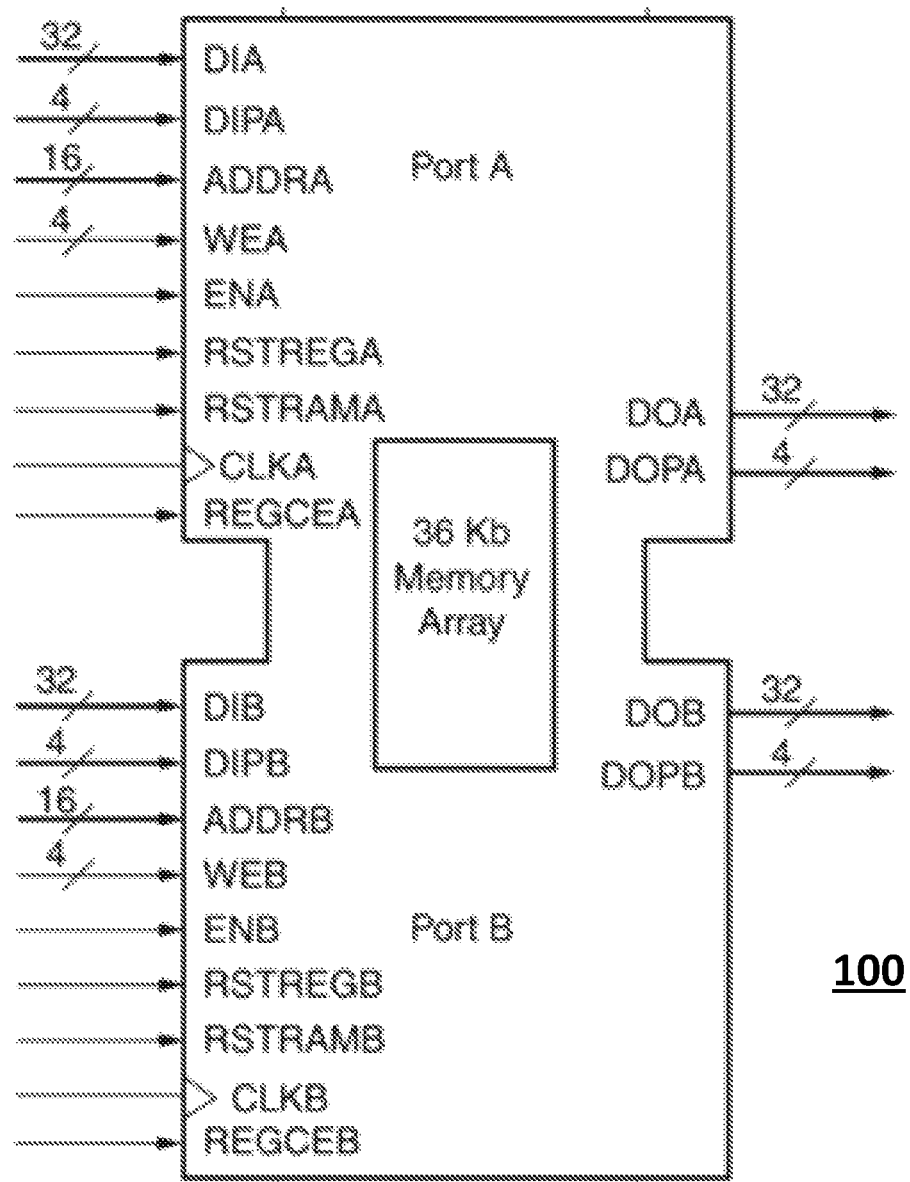
FIG. 1 is a diagram of a two-port memory as is known in the prior art.
Figure 2:
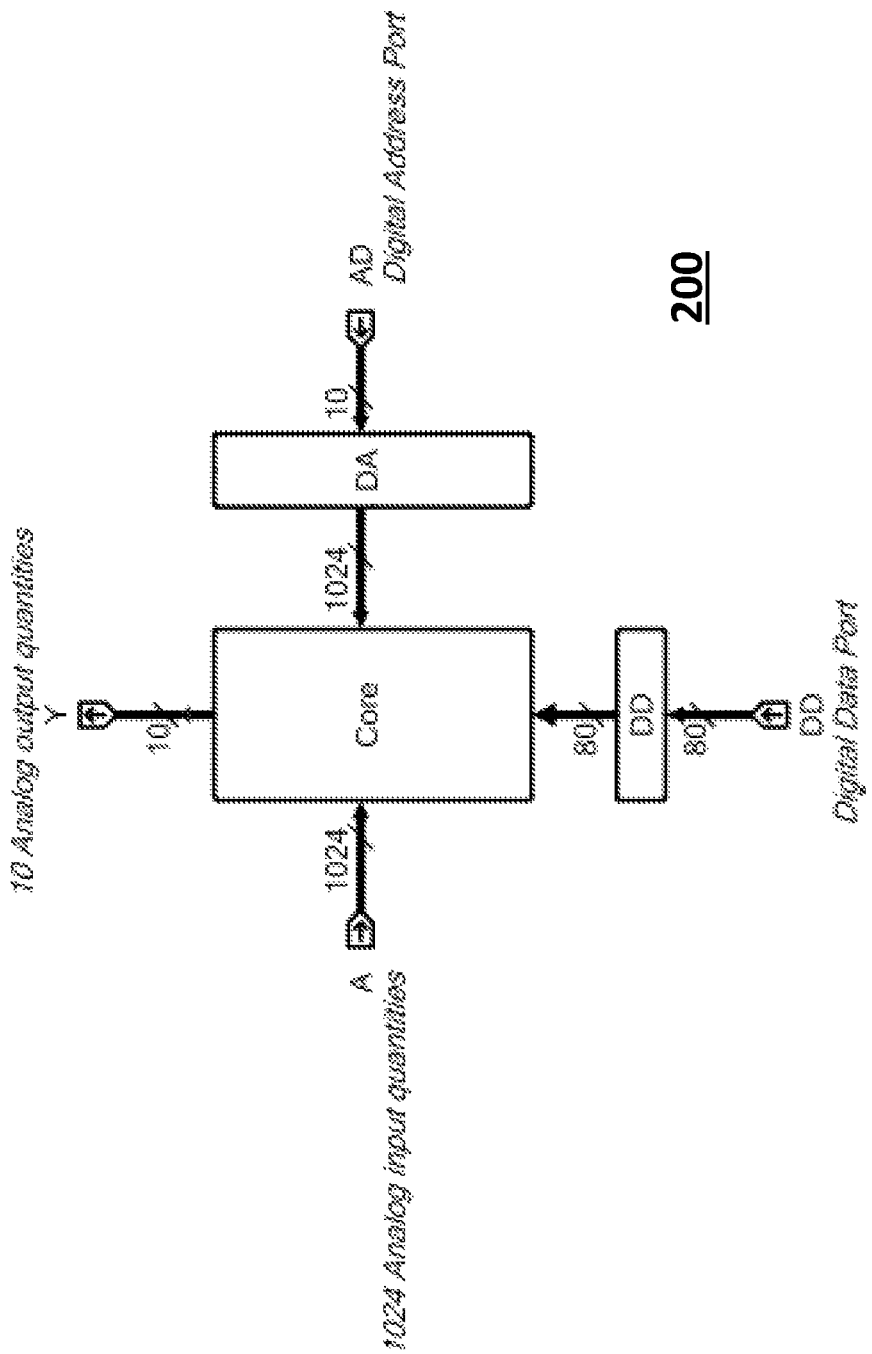
FIG. 2 is a block diagram of one embodiment of a multiport memory with an analog port according to the present approach.

FIG. 2 is a block diagram of one embodiment of a multiport memory 200 with an analog port according to the present approach. As illustrated, multiport memory 200 is a two-port memory with an analog port, a digital port and a core memory. In this example, the core memory is a matrix of memory cells arranged in a plurality of lines, each line having a separate address; in this example, there are 1024 lines of memory cells, each line being 10 values long and thus referred to as a "1 k×10" memory. (While the memory core is described as being a matrix (i.e., columns and rows) of memory cells arranged in "lines," one of skill in the art will appreciate that the lines may be logical and virtual, and the cells themselves may actually have a different orientation for ease of design and/or manufacture.)

The digital port encompasses a digital address port "AD" and a digital data port "DD." As illustrated, in this example digital address port AD is configured to receive a plurality of bits representing the address of one of the lines of memory cells. Digital address port AD here is a bus that is 10 bits wide with an associated address decoder DA to activate one of the 1024 selectable rows of the core. (As above, 1024 is $2^{10}$, and thus 10 bits uniquely identify any single value from 0 to 1023, i.e., a particular line or row of the core memory.)

The digital data port DD of multiport memory 200 is configured to receive a plurality of bits representing values to be stored in the line of memory cells at the address specified by the bits on the digital address port AD. Here digital data port DD is a bus that is 80 bits wide, representing 10 values as discussed below, the same number of values as contained in each line of memory cells in the core memory.

Thus, the digital port of multiport memory 200 may be used to store data in the core memory one line at a time by selecting the address of a 10 byte line of memory cells via digital address port AD, and loading 10 bytes of data into the selected line of memory cells via digital data port DD. With a digital computer operating at a speed of 1 megahertz (MHz) or more, the entire core memory of 1024 lines can be loaded with values in a fraction of a second.

The analog port of multiport memory 200 also has two portions, an analog input port and an analog output port. The analog input port is configured to receive a plurality of analog input quantities; here it receives an input "A" of 1024 input quantities, i.e., voltages, on a bus of 1024 lines. Each of the 1024 input voltages corresponds to a different line or row of memory cells in the memory core, so that each of the 1024 lines or rows of memory cells receives one of the 1024 input voltages. The input voltage for a particular line or row in the core is applied in common to each of the 10 values in that line or row. Any number of the 1024 input voltages can be active.

The analog output port of multiport memory 200 is configured to generate a plurality of analog output quantities; it produces an output "Y" that in this example is an analog port of 10 quantities, the same number of quantities as are stored in each line or row of the core memory. The output quantities Y are the sum of products of each of the analog input voltages A multiplied by the value in the line or row of core memory corresponding to each input voltage. Thus, the first output quantity Y is the sum of each of the analog input voltages A multiplied by the first value in the line or row of core memory corresponding to each analog input voltage, the second output quantity Y is the sum of each of the analog input voltages A multiplied by the second value in the line or row of core memory corresponding to each analog input, etc.

Thus, the output quantities Y represent a sum-of-products signal in which the input quantities A are weighted and summed. A sum-of-products signal is well known in the field of AI; the present approach provides a new and beneficial way to calculate the sum-of-products signal in which the weights may be modified quickly by using the digital port.

Since the input quantities A and output quantities Y are analog, the weighting, or multiplication, of the input should be done in the analog domain as well. For this reason, the data values in the core memory controlled by the digital data are, for example, not merely numbers stored in a digital memory, but rather impedances between the analog input port and the analog output port at each addressed site.

Figure 3:
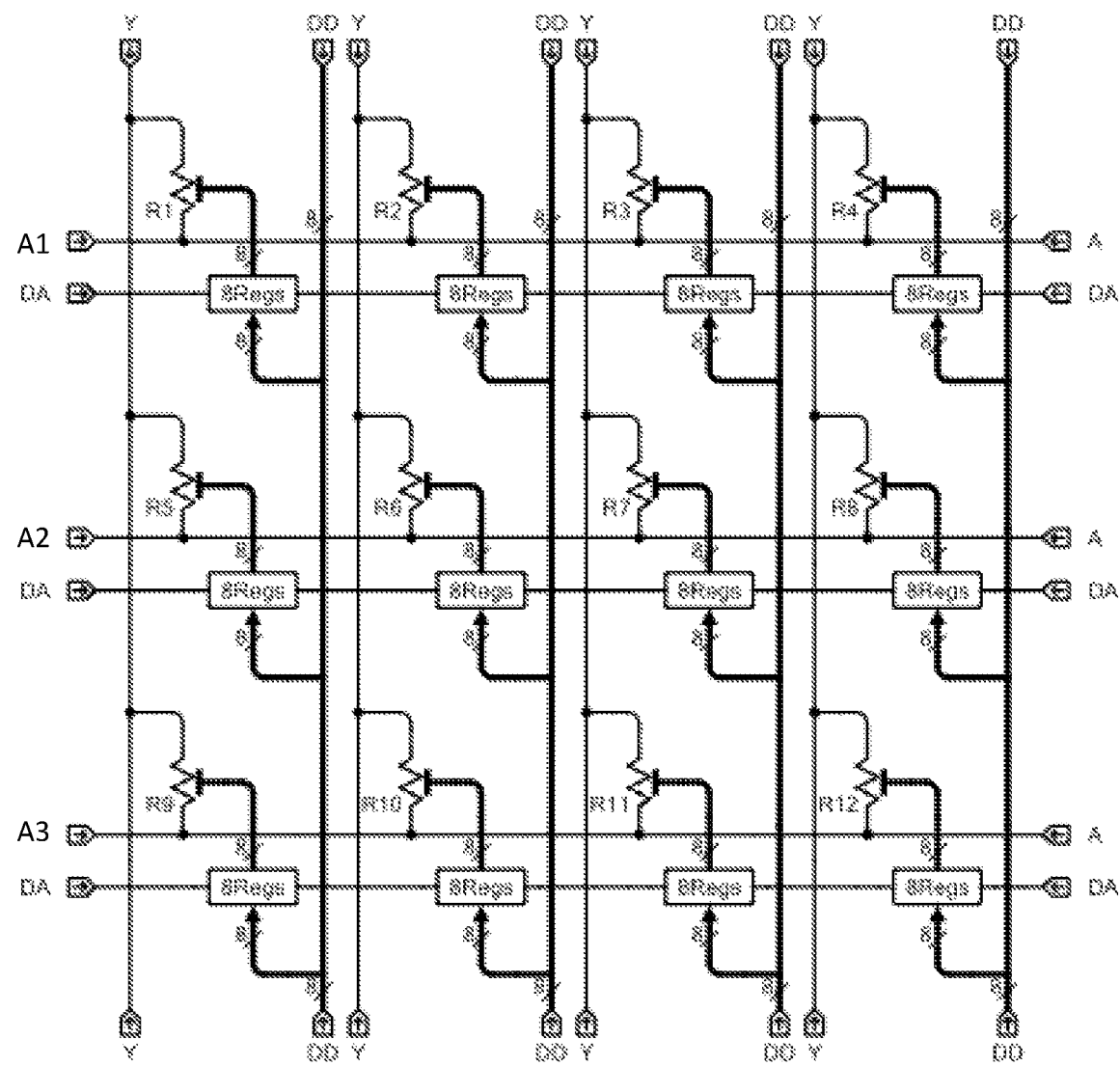
FIG. 3 is a diagram of one embodiment of memory cells of the core memory of a multiport memory having an analog port according to the present approach.

FIG. 3 is a diagram of one embodiment of memory cells of the core memory 300 of a multiport memory having a digital port and an analog port according to the present approach. In this embodiment, the values stored in the core memory are impedances that are programmable by using the bits input on the digital data port.

As shown, in the core memory 300 of FIG. 3, there are three lines or rows of memory cells, each having four cells, i.e., programmable impedances, which in this example are adjustable resistors, and thus four values. Each line receives a different one of the analog input voltages A. Thus, the first line of core memory 300 contains programmable impedances R1 to R4 and receives input voltage A1, the second line contains programmable impedances R5 to R8 and receives input voltage A2, and the third line contains programmable impedances R9 to R12 and receives input voltage A3. In a given implementation, there may be any desired number of lines of memory cells and any desired number of cells in each line.

In this example each programmable impedance R1 to R12 is shown taking eight bits in its control input; thus, the 80 bit bus of the digital data port DD in two-port memory 200 of FIG. 2 provides the values for 10 programmable impedances, i.e., the number of values in each line of the memory care in the example herein, as described above. In the general case, more than one bit is allocated to control each memory cell within the memory core in this fashion; however, in some cases a memory core may be constructed in which the impedances are fixed and only one bit is used for each memory cell to have the impedance be active or inactive, i.e., either present in its fixed amount or a nominally infinite amount, i.e., an open circuit so that it does not pass the analog input voltage.

As shown in FIG. 3, any of the 10 output ports may be connected by programmable impedances to all of the 1024 input ports, i.e., all 1024 input voltages A. Thus, the output signal Y is the weighted sum-of-products of all of the voltages A on the input ports; the weight applied to each input voltage is proportional to 1/R where R is the programmed impedance value.

Figure 4:
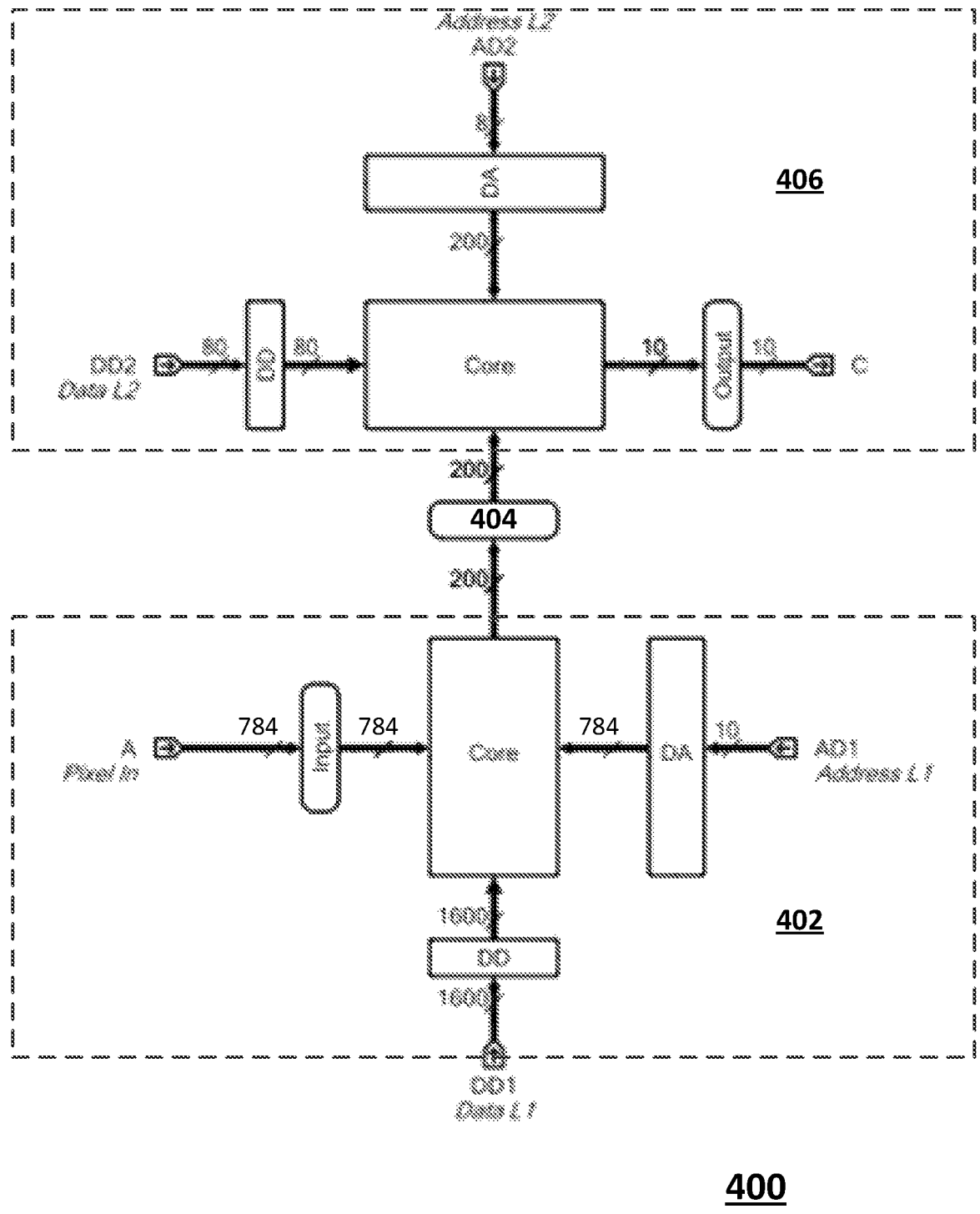
FIG. 4 is a diagram of one embodiment in which a plurality of multiport memories having an analog port may be combined to form a programmable neural network according to the present approach.

A plurality of multiport memories with analog ports as described herein may be used in series and/or parallel to make a programmable neural net. FIG. 4 shows one example of this.

FIG. 4 is a diagram of one embodiment in which a plurality of multiport memories having a digital port and an analog port may be combined to form a programmable neural network according to the present approach.

In FIG. 4, several two-port memories are combined in a neural network 400 configured to perform, for example, handwriting analysis. Neural network 400 is a three-layer neural net having 784 analog input values and 10 analog output values. Each layer in this instance is a neuron consisting of a two-port memory with a digital port and an analog port as described herein.

Handwriting analysis commonly uses the Modified National Institute of Standards and Technology (MNIST) database, which is a large database of handwritten digits that is commonly used for training various image processing systems. The database is also widely used for training and testing in the field of machine learning. The MNIST database contains 60,000 training images and 10,000 testing images, normalized to fit into a 28×28 pixel bounding box.

The three neurons in neural network 400 are two-port memory 402, two-port memory 404, and two-port memory 406.

Two-port memory 402 has a memory core with 784 lines of memory cells (corresponding to the pixels in the MNIST images, which have 28 times 28, or 784, pixels). Thus, the analog input receives 784 values A. Each line of memory cells in two-port memory 402 has 200 values, so that the output consists of 200 sum-of-products values; the 200 values on each line of memory cells requires the digital data input DD1 to have 1600 bits if, as in FIG. 3, each analog value in the memory core is a programmable impedance requiring 8 bits to set. The digital address input AD1 has 10 bits, which is required to address each of the 784 lines of memory separately. (The 10 bits of AD1 will actually address 1024 lines, more than required, but 9 bits would only address 512 lines, which is not enough.)

Two-port memory 404, shown here simply as a black box but is implemented as another instance of two-part memory 402, functions as a hidden layer in neural network 400, and may be omitted in some implementations. It receives the 200 analog output values from two-port memory 402 as inputs, and supplies its 200 analog output values as inputs to two-port memory 406. Although it is a hidden layer, as with two-port memories 402 and 406, two-port memory 404 has a digital control port in addition to an analog port.

Two-port memory 406 receives the 200 analog output values from two-port memory 404, an 8 bit data address signal from address data port AD2 (which is sufficient to address all 200 limes of memory cells in the memory core of two-port memory 406), and 80 bits of digital data (10 values) for each line at digital data port DD2. Two-port memory 406 then outputs the weighted sum-of-products of the 200 analog input values as 10 output analog values C. These 10 output values are sufficient to identify all of the handwriting characters in the MNIST database.

Using two or more instances of the multiport memory with a digital port and an analog port thus allows creation of a completely programmable neural network. It will be clear to one of skill in the art in light of the teachings herein that the multiple address and data buses may be merged into a single address bus and a single data bus in order to simplify access to the digital data ports.

Figure 5:
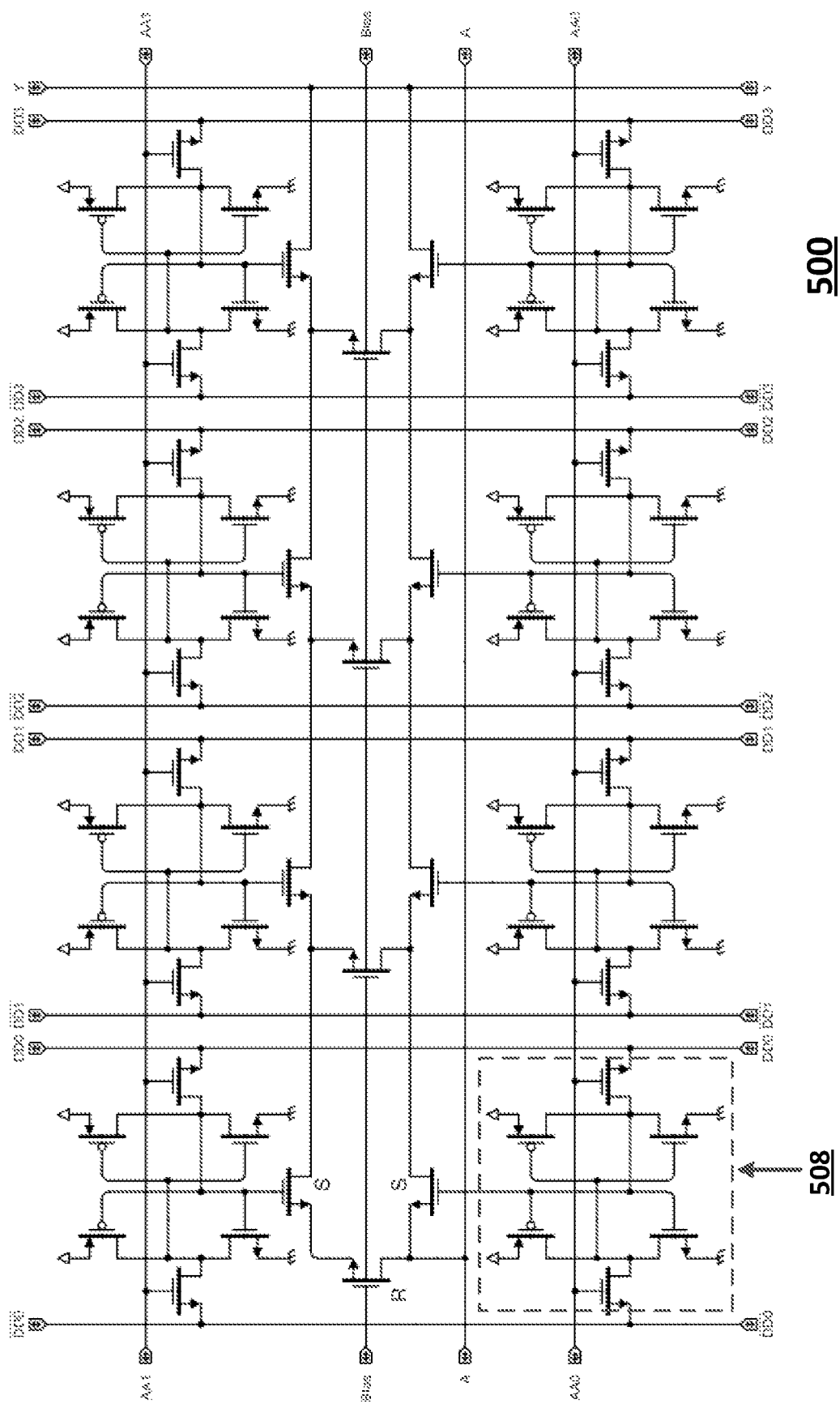
FIG. 5 is a diagram of an example of a transistor implementation of an analog memory cell according to the present approach.

FIG. 5 is a diagram of an example of a transistor implementation of an analog memory cell 500 according to the present approach. Analog memory cell 500 may, for example, be used as each of the programmable impedances R1 to R12 in FIG. 3, or as each of the memory cells described with respect to FIG. 2 and FIG. 4 above.

In analog memory cell 500, as above eight bits are used to program the analog element, which in this example is resistive. The impedance between the analog input A and the analog output Y is determined by series and/or parallel connections of the field effect transistors (FETs) marked as "R," which are biased into their resistive region by the global bias line "Bias." Additional FETS, marked as "S," function as switches, each having effective "open" and "closed" positions depending upon whether the FET is activated, to make the series and/or parallel connections of the R FETs, as determined by the values stored in the analog memory cells.

Each switch S connects to the output of a bit storage cell 508. Various types of bit storage cells are well known in the art; in this example, bit storage cells 508 are of a well known RAM cell design having six FETs; each bit storage cell 508 uses an internal inverter as a latch to turn the switches S on or off. The bit storage cells 508 storing the eight bits controlling the resistive FETs R are split over two adjacent word lines and the data lines are differential. Such techniques are well known to those skilled in the art.

As noted above, any number of the analog input voltage may be active. In some circumstances, it may be desirable to have only a single input value active. For example, in an AI system, there are typically two phases of operation, commonly referred to as training and inference. In the training phase, typically large amounts of known data are presented to the AI system to help the system learn to make predictions. As this is done, incremental changes are made to the weights used by the AI system to process the data, i.e., using the present approach, to the data stored in the core memory of the multiport memory. Once training is complete, the AI system is then used in the inference phase, in which the now trained system is applied to new data to infer a result.

It may be desirable to read out all of the data in the core memory after the AI system has been trained so that, for example, the same data may be used in another AI system without further training of the other AI system. Referring back to FIG. 3, one way to read the data out is to activate each one of the 1024 analog input voltages in turn and read the resulting output values, which will thus only represent the weighting values on the activated line.

By combining these features, it is possible to construct a multiport memory having a digital port and an analog port. One of skill in the art will appreciate that a multiport memory with any number of digital ports may be constructed according to these principles, and further that a plurality of such multiport memories with analog ports as described herein may be used in series and/or parallel to make a programmable neural net.

The disclosed system has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than or in addition to those described above.

For example, as is well understood by those of skill in the art, various choices will be apparent to those of skill in the art. Further, the illustration of transistors and the associated feedback loops, resistors, etc., is exemplary; one of skill in the art will be able to select the appropriate number of transistors and related elements that is appropriate for a particular application.

These and other variations upon the embodiments are intended to be covered by the present disclosure, which is limited only by the appended claims.

What is claimed is:
1. A multiport memory, comprising:
a memory core containing memory cells arranged in a matrix having a plurality of lines, each line having a separate address;
a digital port configured to:
receive a first plurality of bits representing an address of one of the plurality of lines of memory cells; and
receive a second plurality of bits representing values that are to be stored;
the memory core configured to store the values represented by the second plurality of bits in the one of the plurality of lines of memory cells at the address represented by the first plurality of bits; and
an analog port configured to:

receive a plurality of analog input quantities, each input quantity corresponding to one of the plurality of lines of memory cells; and generate a plurality of analog output quantities, the plurality of analog output quantities being a sum of products of each of the analog input quantities multiplied by the value stored on the one of the plurality of lines corresponding to each of the analog input quantities.

2. The multiport memory of claim 1, wherein the memory cells comprise programmable impedance elements.

3. The multiport memory of claim 2, wherein values of the programmable impedance elements are the values represented by the second plurality of bits.

4. The multiport memory of claim 2 wherein each of the programmable impedance elements comprises a plurality of field effect transistors biased into their resistive region and connected in a series and/or parallel combination.

5. The multiport memory of claim 4 wherein the series and/or parallel combination of the field effect transistors is determined by the values represented by the second plurality of bits.

6. The multiport memory of claim 4 wherein each plurality of field effect transistors is connected in the series and/or parallel combination by a plurality of switches.

7. The multiport memory of claim 6 wherein each of the plurality of switches comprises a field effect transistor.

8. The multiport memory of claim 6 wherein each of the plurality of switches is in either an open position or a closed position based upon a bit in the values represented by the second plurality of bits.

9. The multiport memory of claim 8 wherein the bit upon which the open position or closed position is based is stored in a random access memory cell.

10. The multiport memory of claim 9 wherein each random access memory cell comprises a cell of six field effect transistors.

11. A neural network comprising first and second multiport memories, each multiport memory comprising:

a memory core containing memory cells arranged in a matrix having a plurality of lines, each line having a separate address;

a digital port configured to:
receive a first plurality of bits representing an address of one of the plurality of lines of memory cells; and
receive a second plurality of bits representing values that are to be stored;

the memory core configured to store the values represented by the second plurality of bits in the one of the plurality of lines of memory cells at the address represented by the first plurality of bits; and an analog port configured to:
receive a plurality of analog input quantities, each input quantity corresponding to one of the plurality of lines of memory cells;
generate a plurality of analog output quantities, the plurality of analog output quantities being a sum of products of each of the analog input quantities multiplied by the value stored on the one of the plurality of lines corresponding to each of the analog input quantities; and wherein the plurality of analog output quantities generated by the first multiport memory are the analog input quantities received by the second multiport memory.

* * * * *